(12) United States Patent
Wingensiefen (10) Patent No.: US 9,315,122 B2
(45) Date of Patent: Apr. 19, 2016

(54) SEAT FITTING FOR A MOTOR VEHICLE SEAT

(75) Inventor: Wilhelm Wingensiefen, Wermelskirchen (DE)

(73) Assignee: Johnson Controls Metals and Mechanisms GmbH & Co., Solingen (DE)

( * ) Notice: Subject to any disclaimer, the term of this patent is extended or adjusted under 35 U.S.C. 154(b) by 160 days.

(21) Appl. No.: 14/233,587

(22) PCT Filed: Jul. 12, 2012

(86) PCT No.: PCT/EP2012/063716
§ 371 (c)(1),
(2), (4) Date: Jan. 17, 2014

(87) PCT Pub. No.: WO2013/010918
PCT Pub. Date: Jan. 24, 2013

(65) Prior Publication Data
US 2014/0162827 A1 Jun. 12, 2014

(30) Foreign Application Priority Data
Jul. 20, 2011 (DE) .......................... 10 2011 051 990

(51) Int. Cl.
*F16H 1/32* (2006.01)
*B60N 2/225* (2006.01)

(52) U.S. Cl.
CPC ............ *B60N 2/2252* (2013.01); *B60N 2/2254* (2013.01)

(58) Field of Classification Search
None
See application file for complete search history.

(56) References Cited

U.S. PATENT DOCUMENTS

| 4,538,855 | A | 9/1985 | Peetz et al. |
| 4,668,013 | A | 5/1987 | Wahlmann |
| 4,884,844 | A | 12/1989 | Kershaw et al. |
| 5,586,833 | A | 12/1996 | Vossmann et al. |
| 5,779,313 | A * | 7/1998 | Rohee ...................... 297/367 R |
| 6,454,354 | B1 * | 9/2002 | Vossmann et al. ......... 297/367 R |
| 6,578,921 | B2 * | 6/2003 | Koga et al. .................... 297/362 |
| 7,195,318 | B2 * | 3/2007 | Cha et al. .................. 297/367 R |
| 7,380,883 | B2 * | 6/2008 | Koumura .................. 297/367 R |
| 7,517,021 | B2 * | 4/2009 | Wahls et al. .............. 297/367 R |
| 8,201,888 | B2 * | 6/2012 | Fassbender et al. ...... 297/367 L |
| 2004/0004384 | A1 | 1/2004 | Iwata et al. |
| 2006/0084547 | A1 | 4/2006 | Dill et al. |
| 2007/0200408 | A1 | 8/2007 | Ohta et al. |

(Continued)

FOREIGN PATENT DOCUMENTS

CN 1849472 A 10/2006
DE 32 26 714 A1 1/1984

(Continued)

*Primary Examiner* — Dirk Wright
(74) *Attorney, Agent, or Firm* — McGlew and Tuttle, P.C.

(57) ABSTRACT

A motor vehicle seat fitting includes a fitting top part with a ring gear (21) having internal toothing, a fitting bottom part with a gear wheel (4), having external toothing and which is in engagement with the ring gear, an eccentric arranged rotatably in a bore (7) of the bottom part running axially to the gear wheel, for rolling adjustment of the gear wheel relative to the hollow gear, and a drive shaft, which drives the eccentric and extends axially to the ring gear. A cam receptacle (17) is arranged on one of the gear wheel or the ring gear (21) and a stop cam (16), that engages in the cam receptacle, is arranged on the other of the gear wheel or ring gear, in a ring portion between the external toothing and the bore and on the ring gear in a zone which may overlap the ring portion.

18 Claims, 10 Drawing Sheets

(56) References Cited

U.S. PATENT DOCUMENTS

| | | |
|---|---|---|
| 2010/0180705 A1 | 7/2010 | Mitsuhashi |
| 2013/0241262 A1 | 9/2013 | Beneker et al. |

FOREIGN PATENT DOCUMENTS

| | | |
|---|---|---|
| DE | 41 08 955 A1 | 5/1992 |
| DE | 10 2004 020 911 A1 | 11/2005 |
| DE | 10 2008 036647 A1 | 6/2009 |
| DE | 10 2009 001 309 A1 | 9/2009 |
| DE | 10 2009 044 434 A1 | 9/2010 |
| EP | 1 284 447 A1 | 2/2003 |
| FR | 2 705 288 A1 | 11/1994 |
| GB | 2 219 735 A | 12/1989 |
| JP | 2002-112848 A | 4/2002 |
| JP | 2005 021487 A | 1/2005 |
| JP | 2007-144121 A | 6/2007 |
| JP | 2009-247393 A | 10/2009 |
| JP | 2010-253101 A | 11/2010 |
| JP | 2011 087843 A | 5/2011 |
| WO | 2005/025930 A2 | 3/2005 |
| WO | WO 2012001769 A1 * | 1/2012 |

* cited by examiner

SEAT FITTING FOR A MOTOR VEHICLE SEAT

CROSS REFERENCE TO RELATED APPLICATIONS

This application is a United States National Phase Application of International Application PCT/EP2012/063716 filed Jul. 12, 2012 and claims the benefit of priority under 35 U.S.C. §119 of German Patent Application DE 10 2011 051 990.4 filed Jul. 20, 2011, the entire contents of which are incorporated herein by reference.

FIELD OF THE INVENTION

The invention relates to a seat fitting for a motor vehicle seat, with
 a fitting top part with a ring gear that has internal toothing,
 a fitting bottom part with a gear wheel, which has external toothing and which is in engagement with the ring gear,
 an eccentric arranged rotatably in a bore of the fitting bottom part running axially to the gear wheel for rolling adjustment of the gear wheel relative to the ring gear, and
 a drive shaft, which drives the eccentric and extends axially to the ring gear.

BACKGROUND OF THE INVENTION

Seat fittings of the initially named type, as are known for example from the document DE 10 2008 036 647, are installed with motor vehicle seats for adjusting the backrest that is adjustable relative to the seating part, wherein one fitting part is connected to the seating part and another fitting part is connected to the backrest. With such seat fittings, a rotation of the eccentric is caused by a rotation of the drive shaft, whereby a tumbling rolling of the annular gears is attained in the manner of a wobble gearing. Here, a swiveling of the fitting parts relative to each other results due to the difference in the number of teeth.

Seat fittings of the aforementioned type allow the implementation of a continuously variable adjustment, wherein the required installation space for the seat fitting is extremely small. In addition, the eccentricity of the eccentric is suitable to cause a self-locking which reliably secures the seat fitting in any adjusted position.

The swivel range of a backrest relative to a seating part that is provided by the seat fittings is typically attained by stops arranged externally on the fitting parts. Such stops and the precise positioning thereof are necessary to prevent seizing at the ends of the adjustment zone, wherein this is necessary in particular in the case of electrically driven seat fittings. The stops usually arranged externally on the seat fittings have the disadvantage that an operating space must be kept free for these in the swivel range of the seat fitting. Moreover, the design of the end stops leads to increased production costs and ultimately contains the danger of pinching, both for padded parts as well as for the user.

SUMMARY OF THE INVENTION

The object of the invention is to provide a seat fitting of the aforementioned type, the swivel range of which is reliably defined by suitable means.

An adjustment of the seat fitting according to the invention, whereby the fitting top part is displaced relative to the fitting bottom part, is attained by rotating the drive shaft extending axially relative to the ring gear. This results in a drive of the eccentric, which causes a rolling adjustment of the gear wheel relative to the ring gear, which results in the fitting top part being swivelled relative to the fitting bottom part. Due to the system, the gear wheel is arranged within the ring gear and in the event of an adjustment, performs a tumbling motion caused by the eccentric.

According to the invention, the gear wheel or the ring gear has a cam receptacle and the gear, not having the cam receptacle, has a stop cam that engages in the cam receptacle. Here, the cam receptacle and the stop cam are arranged in a ring portion between the external toothing and the bore of the ring gear. In order to guarantee an interaction with the cam receptacle or the stop cam on the ring gear, the cam receptacle or the stop cam are arranged on the ring gear in a zone which is overlapped by the aforementioned cam receptacle or the ring portion of the gear wheel having stop cams.

The design of the cam receptacle, in particular the longitudinal extension thereof determines, by means of the stop cams, the adjustment zone of the fitting bottom part relative to the fitting top part, wherein the stop cam can be adjusted in the zone between the opposing side surfaces of the cam receptacle.

The design according to the invention of the adjustment zone of the gear wheel relative to the ring gear by means of a stop cam adjustable in a cam receptacle permits implementation in a particularly simple and cost effective manner, because for production only one stop cam must be arranged and one cam receptacle must be formed. Moreover, the design according to the invention has the advantage that due to the arrangement of the stop cam and cam receptacle being within the seat fitting, the danger of pinching of foreign parts is completely excluded. In addition, compared to known seat fittings with stops lying externally, the seat fitting according to the invention has a smaller installation space.

The design of the cam receptacle and the stop cam in engagement with the cam receptacle can, in principle, occur in any manner. Thus, the cam receptacle can be formed, for example, by a simple opening, which has no specific adaptation to the movement zone of the stop cam relative to the cam receptacle. However, according to a particularly advantageous design of the invention, the cam receptacle and/or the stop cam have a coaxial progression relative to the associated bore of the gear wheel or ring gear. According to this design of the invention, the cam receptacle within which the stop cam is adjustable, is in particular arranged coaxially to the central bore of the gear, which comprises the cam receptacle. Using this design of the invention there is the possibility to form the cam receptacle with only very minimal material removal such that the stability of the wheel having the cam receptacle is not substantially changed due to the design of the cam receptacle. The stop cam can also have a coaxial progression corresponding to the cam receptacle, wherein according to a particularly simple design of the invention, the stop cam is formed by a pin having a circular cross-section. This is particularly simple to produce and can be connected to the gear supporting the stop cam.

The swivel range of the seat fitting is determined according to the invention by the interaction of stop cam and cam receptacle, wherein the stop cam moves in the adjustment zone between the opposing side surfaces of the cam receptacle oriented in the peripheral direction, wherein at the ends of the swivel range, the stop cam rests on the side surfaces of the cam receptacle.

According to a particularly advantageous design of the invention, the side surfaces of the stop cam oriented in the peripheral direction have a shape matched to the side surfaces of the cam receptacle. According to this design of the invention, the side surfaces coming into contact with each other at the end of the swivel range are adapted to each other such that the surfaces assigned to each other come into surface contact. Due to this design of the invention a particularly reliable end stop is provided, wherein in particular a seizing of the side surface is prevented in a particularly advantageous manner.

The arrangement of the stop cam on the gear wheel or ring gear can, as already represented above, basically occur in any manner. Thus, the stop cam can be formed, for example, integrally with the gear wheel or ring gear, for example using stamping. According to an advantageous design of the invention, it is provided however that the stop cam is arranged, secured against rotation, on a stop cam carrier that can be connected to the ring gear or gear wheel.

According to this design of the invention, the stop cam is not formed integrally with the gear wheel or ring gear, but rather arranged on a separate component, secured against rotation, that can be connected to the ring gear or gear wheel, which is positioned in the zone between the ring gear and the gear wheel. In the assembled state, the stop cam projects from the gear wheel or ring gear connected to the stop cam carrier into the cam receptacle of the other gear.

The use of a separate stop cam carrier facilitates the production of the seat fitting in a supplementary manner and in addition, increases the variability of the seat fittings that can be produced from the components. Here, the arrangement of the stop cam carrier can in principle occur in any manner. Thus, there is the possibility to weld or to bond the stop cam carrier to the gear wheel or ring gear, to design this such that the stop cam carrier substantially fills the available installation space, or it is possible to provide additional support points. According to an advantageous design of the invention, however, the stop cam carrier is formed, and the ring gear or the gear wheel has a corresponding design, such that the stop cam carrier in the installed state is secured against rotation relative to the gear wheel or the ring gear.

According to this design of the invention, the stop cam carrier can have, for example, radially projecting projections, which engage in corresponding recesses in the ring gear or the gear wheel. In addition, the stop cam carrier and the ring gear or gear wheel can have a contour blocking rotation. This design of the invention allows a simple and variable assembly of the seat fitting. An additional securing of the positioning can be attained here, possibly using a further component. Thus, a separation ring having a clip-on device can be used for the purpose of fixing the stop cam carrier in the position thereof on the gear wheel or ring gear.

As with the stop cam, the cam receptacle can in principle also have any shape and be formed freely. Here, an essential feature of the cam receptacle is that the receptacle permits the adjustable reception of the stop cam, and thereby limits the movement zone of the stop cam in the peripheral direction of the ring gear or the gear wheel due to the side surfaces. Thus, the cam receptacle can be formed, for example, by a simple opening in the ring gear or the gear wheel.

According to an alternative design of the invention, the cam receptacle is however formed by a cavity circumferential in the installed state, which is interrupted by a locking element. Here, the cavity is formed in the installed state between the gear wheel and the ring gear and progresses coaxially to the axis of the fitting. For limiting the movement zone of the stop cam within the cam receptacle, that is, for defining the adjustment zone of the fitting top part relative to the fitting bottom part, here the locking element is arranged within the cavity, projecting in the direction of the stop cam, so that the side surfaces of the locking element serve as a stop for the stop cam.

Here, the design of the locking element can be selected freely. However, it is preferable in particular to produce this element using punching of the ring gear or gear wheel. As with the stop cam carrier, here, the locking element can also be positioned individually. This allows seat fittings corresponding to different customer requirements to be produced in a simple manner.

Due to the system, during an adjustment of the ring gear relative to the gear wheel, the stop cam relative to the cam receptacle describes a cycloid-shaped path within the cam receptacle due to the rolling adjustment created by the eccentric. During the adjustment, the portion of the movement of the stop cam oriented in the radial direction varies relative to the portion of the movement of the stop cam oriented in the peripheral direction.

According to a particularly advantageous design of the invention, it is provided that the stop cam and the cam receptacle are formed such that during an adjustment, the stop cam moved on a cycloid-shaped path relative to the cam receptacle, comes into contact with the side surface of the cam receptacle in the zone of the movement path, in which the portion of the movement of the path oriented in the peripheral direction is greater than the portion of the movement path oriented in the radial direction. According to this design of the invention, the cam receptacle and the stop cam are matched to each other such that these come in contact against each other when the portion of the movement pointing in the peripheral direction is greater than the portion of the movement oriented in the radial direction. As a result, a seizing of the stop cam and cam receptacle can be prevented in a particularly reliable manner. When the stop cam and cam receptacle come into contact with each other, the danger of seizing can exist if the portion of the movement of the stop cam in the radial direction is significantly greater than the portion of the movement in the peripheral direction.

Basically, the advantages attained by using the invention are already attained due to the design of the seat fitting having a cam receptacle and a stop cam. Beyond that, there are numerous further designs, wherein for example two or more cam receptacles of the same length can be provided with associated stop cams. According to a particularly advantageous design of the invention, however, several cam receptacles, preferably two cam receptacles, in particular, preferably three cam receptacles having different lengths are arranged in the peripheral direction on the ring gear or gear wheel. This design of the invention allows seat fittings with different adjustment zones to be defined with identical components, in particular with the provision of only one stop cam, depending on the installation position of the gear wheel relative to the ring gear, namely with the selection of the cam receptacle in which the preferably one cam is arranged. Thus, this design of the invention allows a cost-effective production of a seat fitting, which with identical components can be adapted to different manufacturer specifications.

The design of the fitting top part, or respectively fitting bottom part, to be connected to the seating part and the backrest, is in principle freely selectable. According to a particularly advantageous design of the invention, the fitting top part however, is formed integrally with the ring gear and/or the fitting bottom part is formed integrally with the gear wheel. Using this design of the invention, an additional assembly of the ring gear and/or the gear wheel to the fitting top part and/or fitting bottom part can be omitted. The thusly further developed seat fitting can be produced particularly easily and cost-effectively, because in particular, additional assembly steps can be omitted.

The design of the eccentric for the drive of the gear wheel relative to the ring gear can be basically formed in any manner. According to a particularly advantageous design of the invention, however, the eccentric has a catch and two wedge segments. Depending on the design of the catch and the orientation thereof relative to the wedge segments, which causes an eccentric arrangement of the gear wheel relative to the longitudinal axis of the ring gear, an adjustment zone of the drive shaft can be defined in the range of which an adjustment does not result in a direct displacement of the fitting top part relative to the fitting bottom part. The use of a catch in conjunction with two wedge segments is distinguished by the simple construction and reliable function.

In order to guarantee a reliable abutment of the wedge segments in the slide ring arranged in the bore of the gear wheel, according to a particularly advantageous design of the invention it is provided that these are pushed apart in the peripheral direction using a spring element, in particular an omega spring. The use of an omega spring can be implemented in a particularly simple and cost-effective manner, wherein due to the design thereof, this can be arranged in the seat fitting in a particularly space-saving manner.

Example embodiments of the invention are described in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
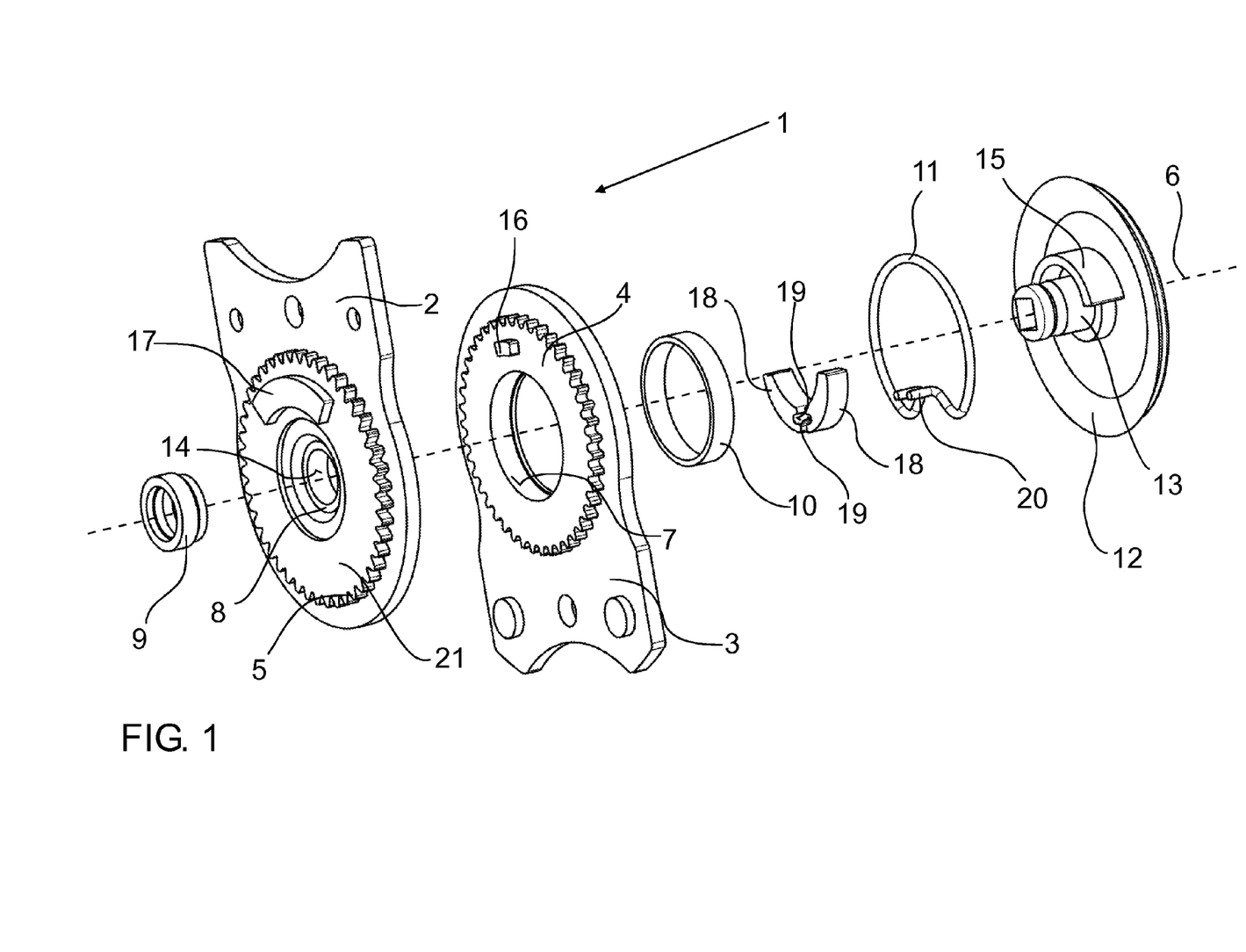
FIG. 1 is an exploded representation of a first embodiment of a seat fitting with a cam receptacle and a cam.

Referring to the drawings in particular, FIG. 1 shows a first embodiment of a vehicle seat fitting 1 in an exploded representation. The vehicle seat fitting 1 has a fitting top part 2 and a fitting bottom part 3, which can be connected to a seating part, not shown here, and a backrest of a motor vehicle seat, also not shown.

The fitting top part 2 has a ring gear 21 having an internal toothing 5. The ring gear 21 has a cam receptacle 17 in the zone between the internal toothing 5 and a bore 14 running axially to the ring gear 21. This receptacle extends coaxially to the bore 14.

The fitting bottom part 3 has a gear wheel 4 that on the side thereof facing toward the fitting top part 2, is provided with a stop cam 16, which in the assembled state of the vehicle seat fitting 1, in which the gear wheel 4 is arranged within the ring gear 21, runs within the cam receptacle 17. Here, the gear wheel 4 has a smaller number of teeth than the ring gear 21 such that with an eccentric arrangement of the gear wheel 4 relative to the ring gear 21, the gear wheel performs a tumbling movement relative to the fitting top part 2.

In order to attain an eccentric arrangement of the gear wheel 4 relative to the ring gear 21, the vehicle seat fitting 1 has an eccentric that is formed from two wedge segments 18 and a catch 15 arranged on a drive gear 12. In the assembled state of the vehicle seat fitting 1, the wedge segments 18 abut within a slide ring 10, which is arranged in a bore 7 of the gear wheel 4. The drive gear 12 extends with a stub shaft 13 along the fitting axis 6 proceeding axially relative to the ring gear 21, wherein the catch 15 arranged coaxially to the stub shaft 13 is arranged with the face sides thereof so that it can be brought into engagement with the face side of the wedge segments 18. Here, the wedge segments 18 are pretensioned apart from each other in the peripheral direction by a spring 11, which are located with the spring ends 20 thereof, which extend parallel to the fitting axis 6, in recesses 19 of the wedge segments 18. A retaining ring 9, which in the assembled state proceeds coaxially to the end of the stub shaft 13, serves for securing the position of drive gear 12.

Thus, in the assembled state, the center point of the bore 7 of the gear wheel 4 is displaced relative to the fitting axis 6 running through the center point of the bore 14, by the off-center measure resulting from the difference of the rolling circles of the gearings. The sickle-shaped intermediate space is filled by the wedge segments 18 arranged in mirror-image.

Figure 3:
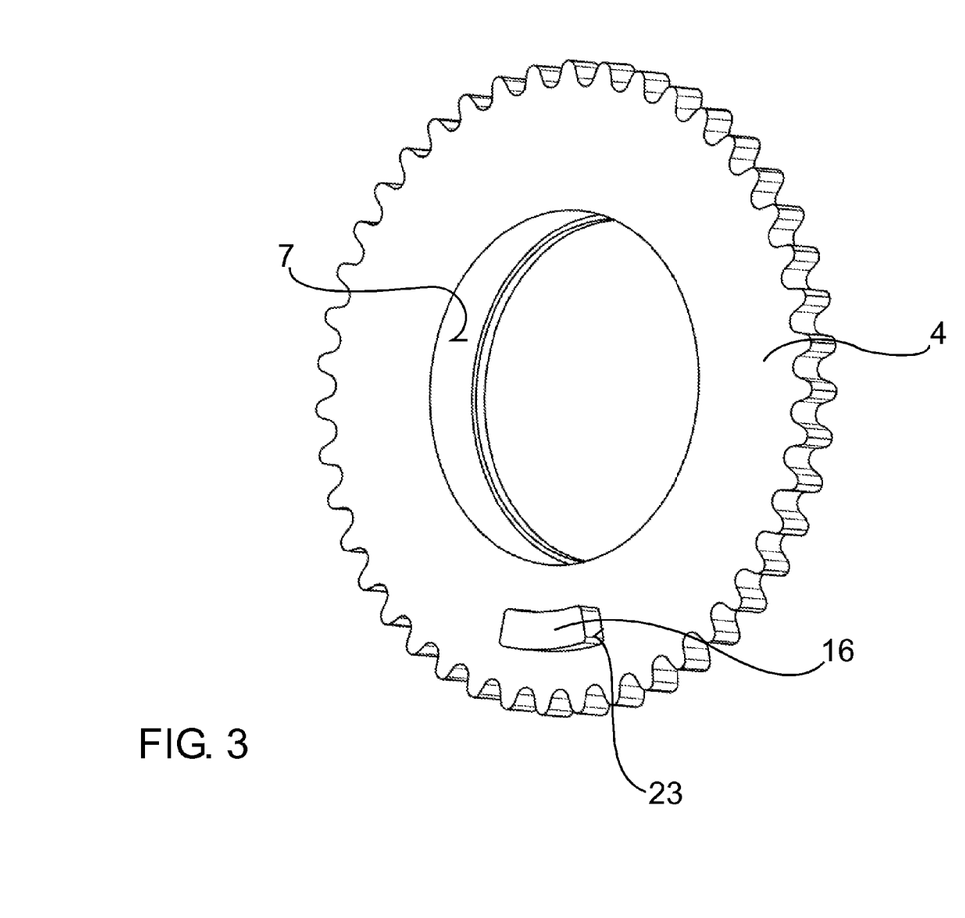
FIG. 3 is a perspective representation of a gear wheel of the seat fitting from FIG. 1.
Figure 6:
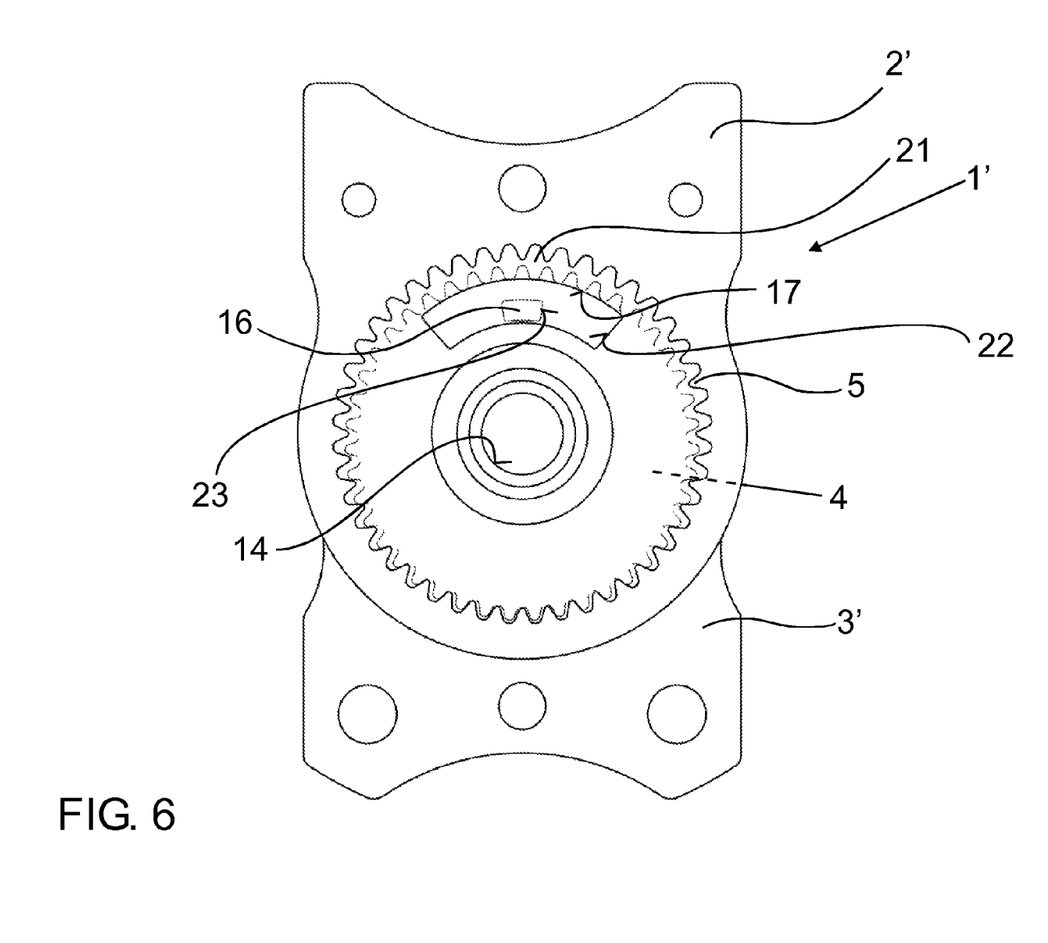
FIG. 6 is a top view of the seat fitting from FIG. 1 with a stop cam arranged in a central zone.
Figure 7:
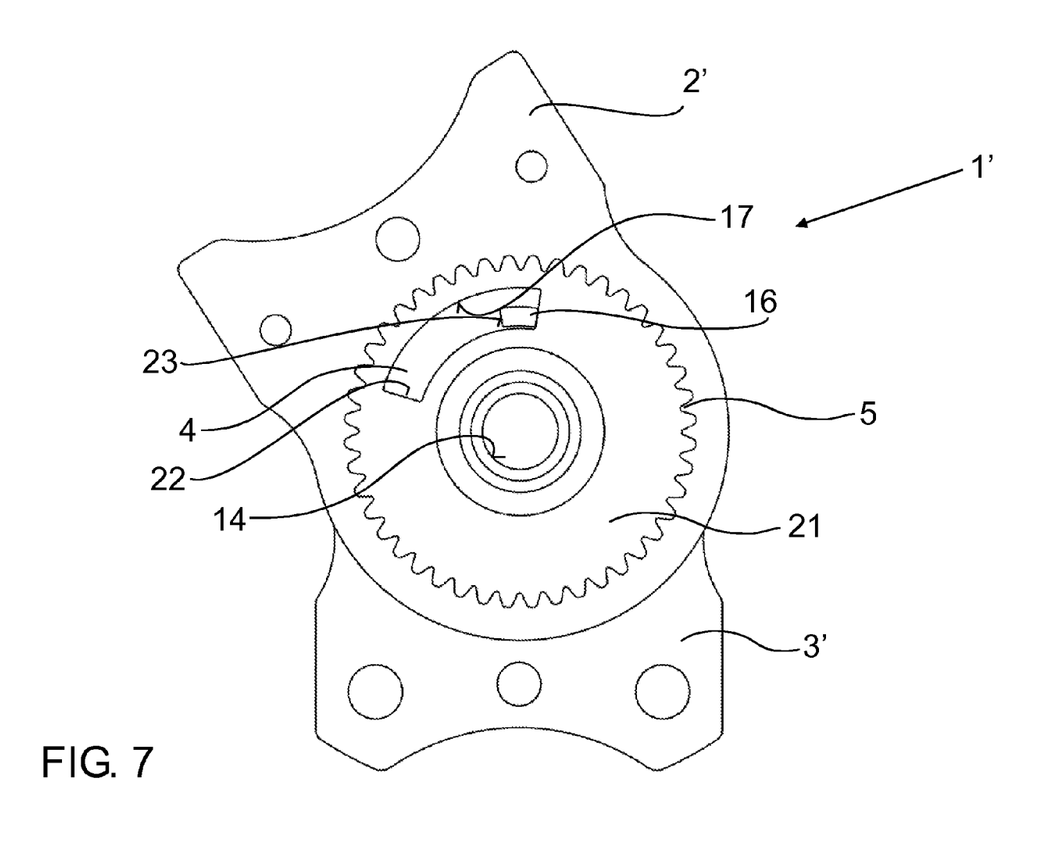
FIG. 7 is a top view of the seat fitting from FIG. 1 with a stop cam arranged on a side surface of the cam receptacle.
Figure 8:
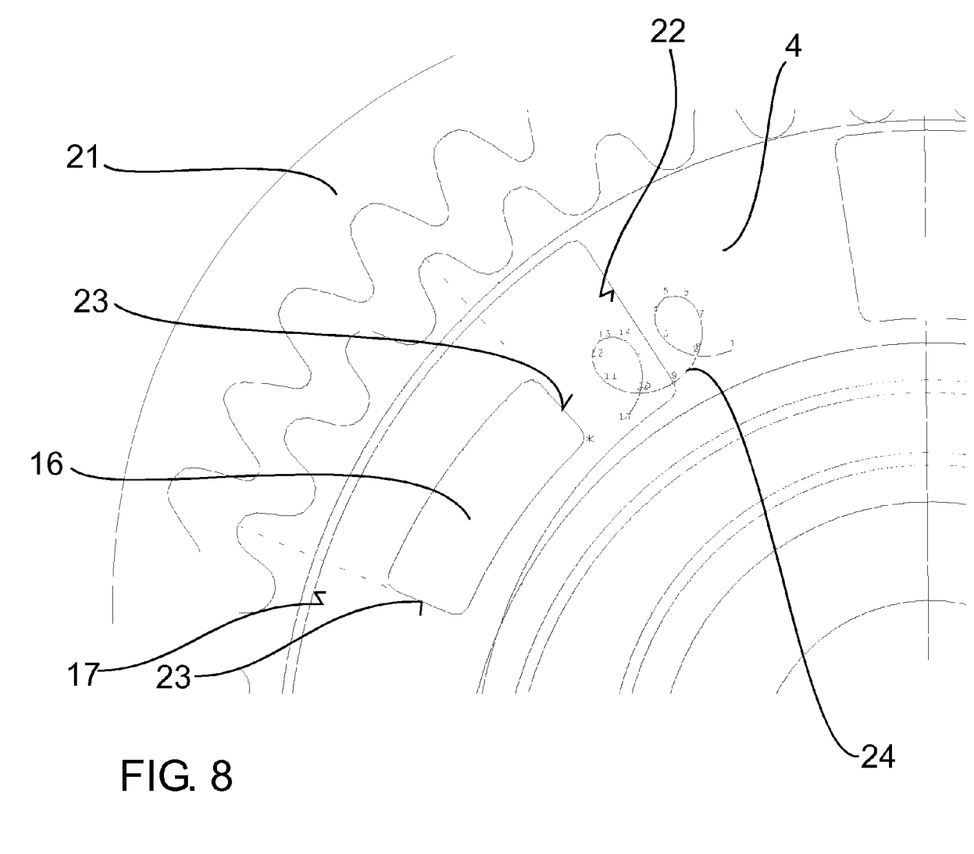
FIG. 8 is an enlarged representation of a stop cam, with a depicted path, arranged in a cam receptacle.

In the event of a drive of the drive gear 12 via a hand wheel connected, secured against rotation, to the stub shaft 13, or an electric motor drive, a displacement of the catch 15 occurs in the direction toward the free ends of the wedge segments 18 within the slide ring 10. Due to the eccentricity, during an adjustment of the wedge segments 18, the gear wheel 4 rolls on the ring gear 21, wherein the stop cam 16 arranged in the cam receptacle 17 moves in a cycloid shaped path 24, as shown in FIG. 8 (see FIGS. 3, 6 and 7).

The adjustment zone of the vehicle seat fitting 1 is defined by the stop cam 16 and the cam receptacle 17, wherein the stop cam 16 moves within the cam receptacle 17 between the side surfaces 22 of the cam receptacle 17, wherein in the end positions of the vehicle seat fitting, the side surfaces 23 of the stop cam 16 come into contact with the side surfaces 22 of the cam receptacle 17.

Figure 2:
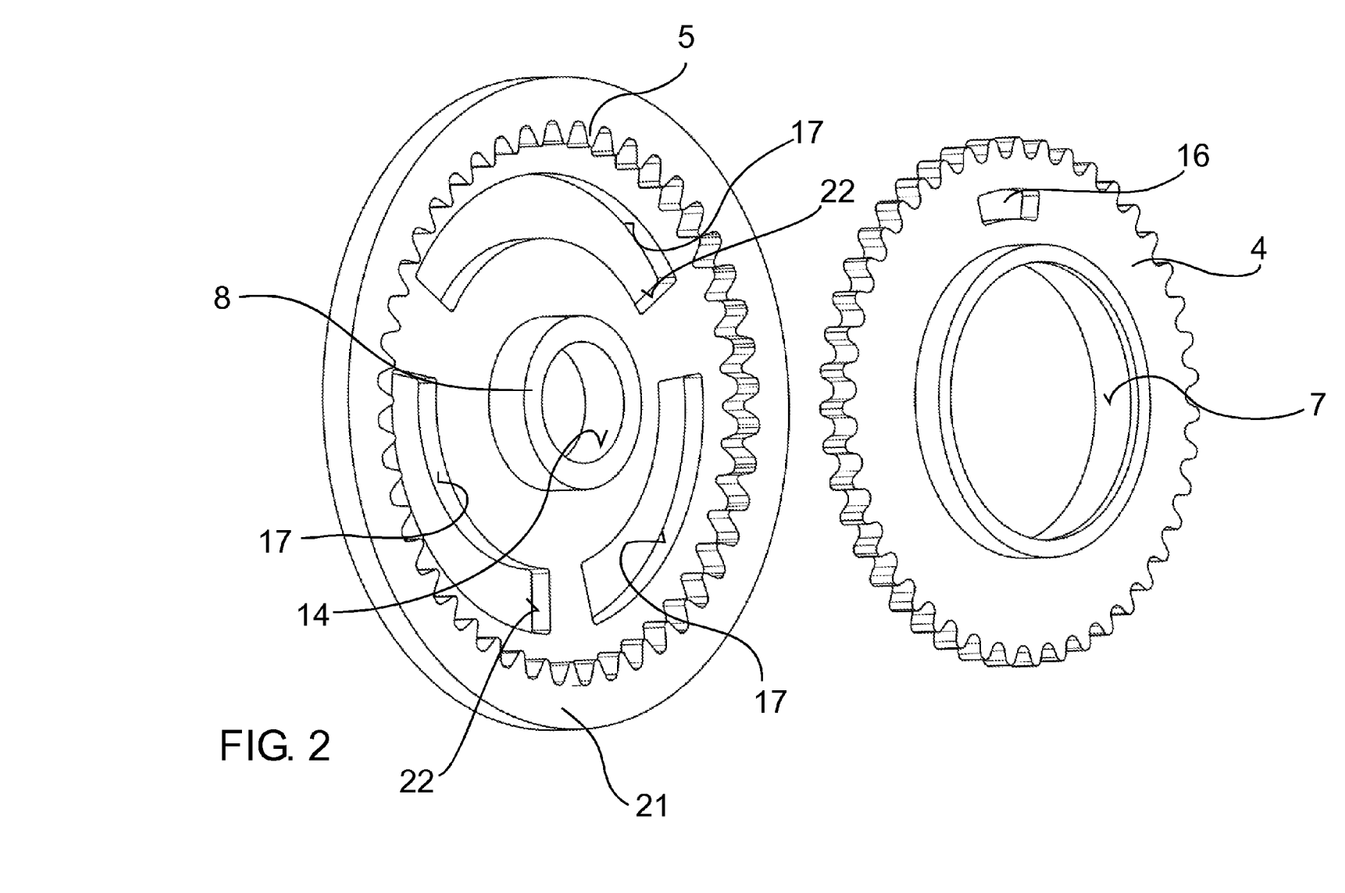
FIG. 2 is an exploded representation of a ring gear and a gear wheel of a second embodiment of a seat fitting having three cam receptacles.
Figure 4:
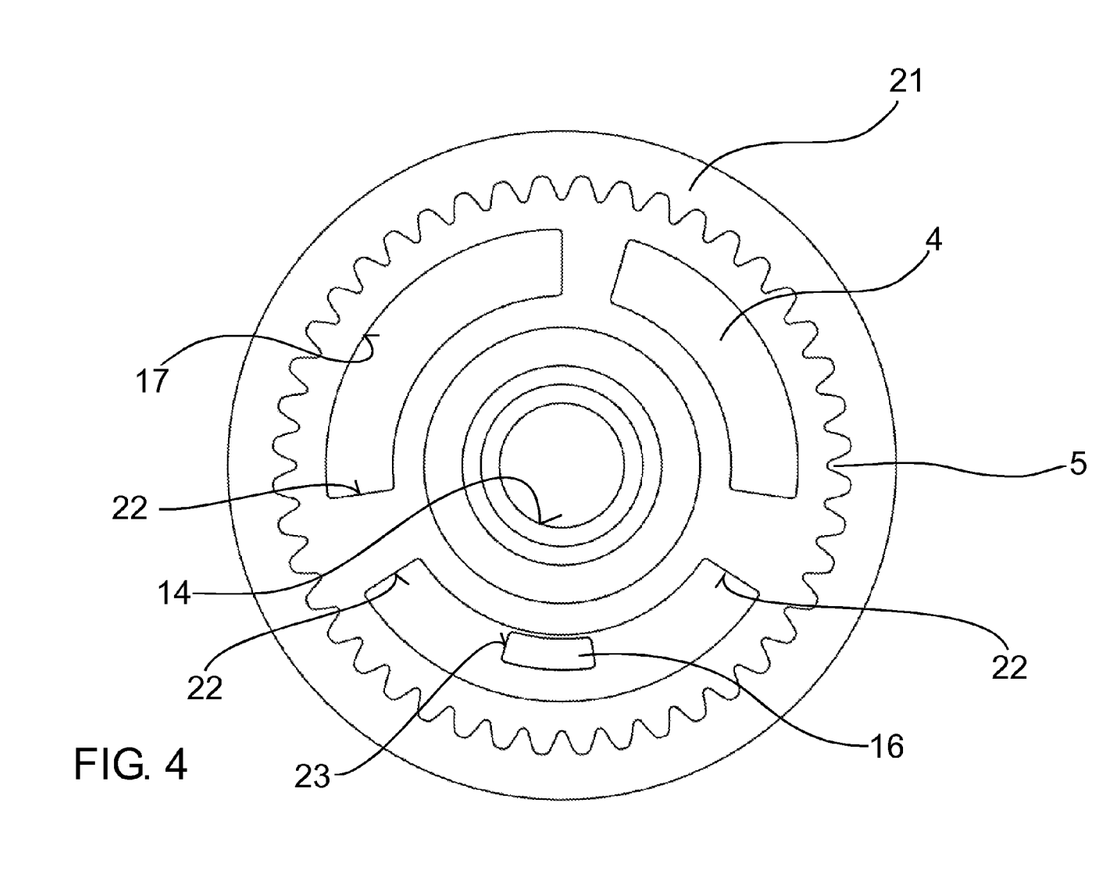
FIG. 4 is a top view of the ring gear from FIG. 2 with three cam receptacles and a stop cam arranged in a central zone of a cam receptacle.
Figure 5:
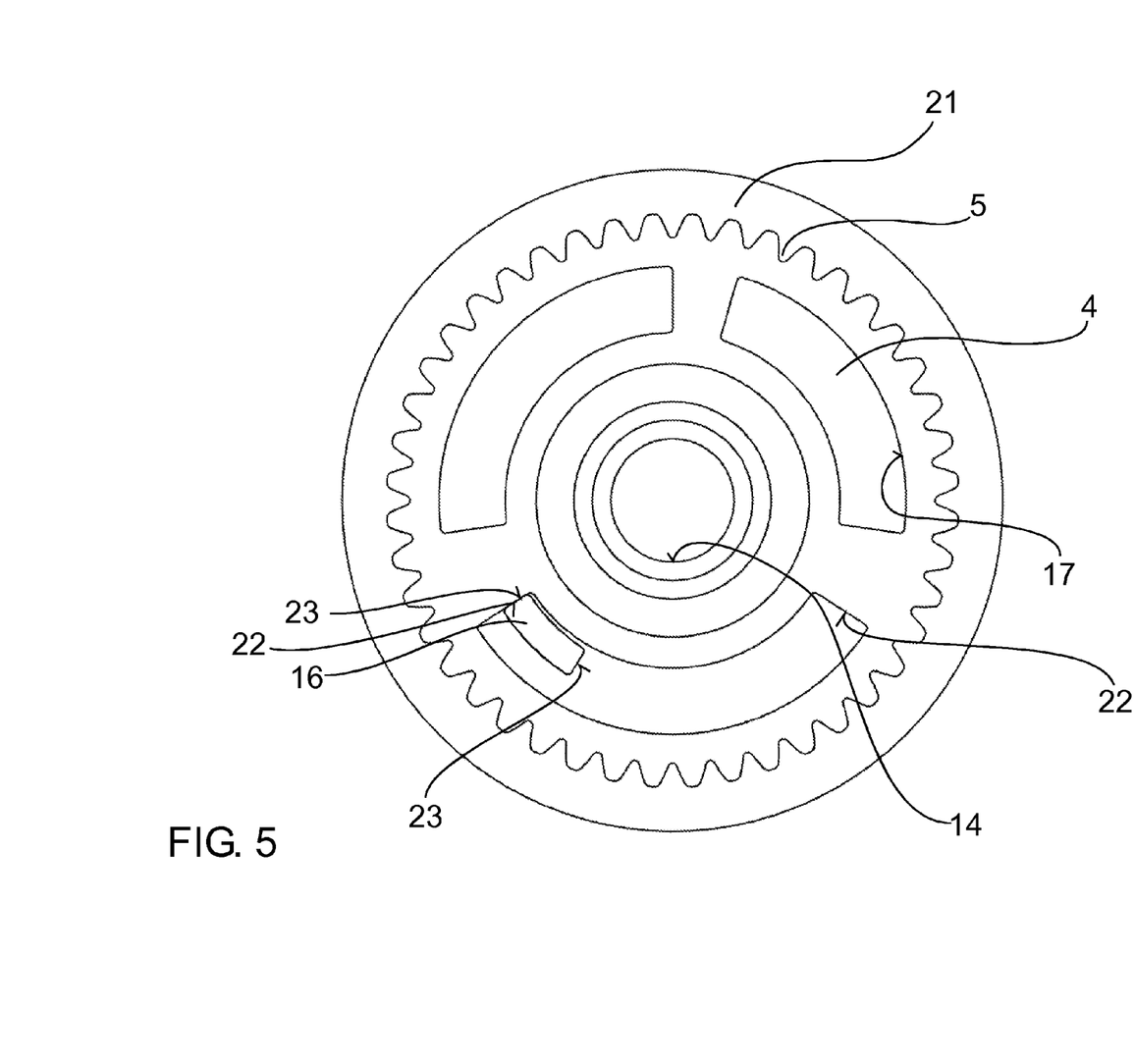
FIG. 5 is a top view of the ring gear from FIG. 2 with a stop cam located in an end position.

With the example embodiment shown in FIGS. 2, 4 and 5, the ring gear 21 differs from the ring gear 21 shown in FIG. 1 in that this has three cam receptacles 17 of different lengths. Thus, there is the possibility, depending on the installed location of the gear wheel 4 relative to the ring gear 21, to form a seat fitting 1 with different swivel ranges, wherein this can occur using identical components. The length of the cam receptacle 17, in which the stop cam 16 is arranged, determines the swivel range of the vehicle seat fitting 1.

In order to prevent a seizing of the stop cam 16 with the side surfaces 22 of the cam receptacle 17, these are designed such that the stop cam 16 with the side surface 23 thereof comes into contact with the side surface 22 of cam receptacle only then when the portion of the movement of the path 24 oriented in the peripheral direction is greater than the portion of the moment oriented in the radial direction. In the path 24 shown in FIG. 8, this means that the stop cam 16 ideally is in engagement with the side surface 22 at point 9 of the represented path 24.

Figure 9:
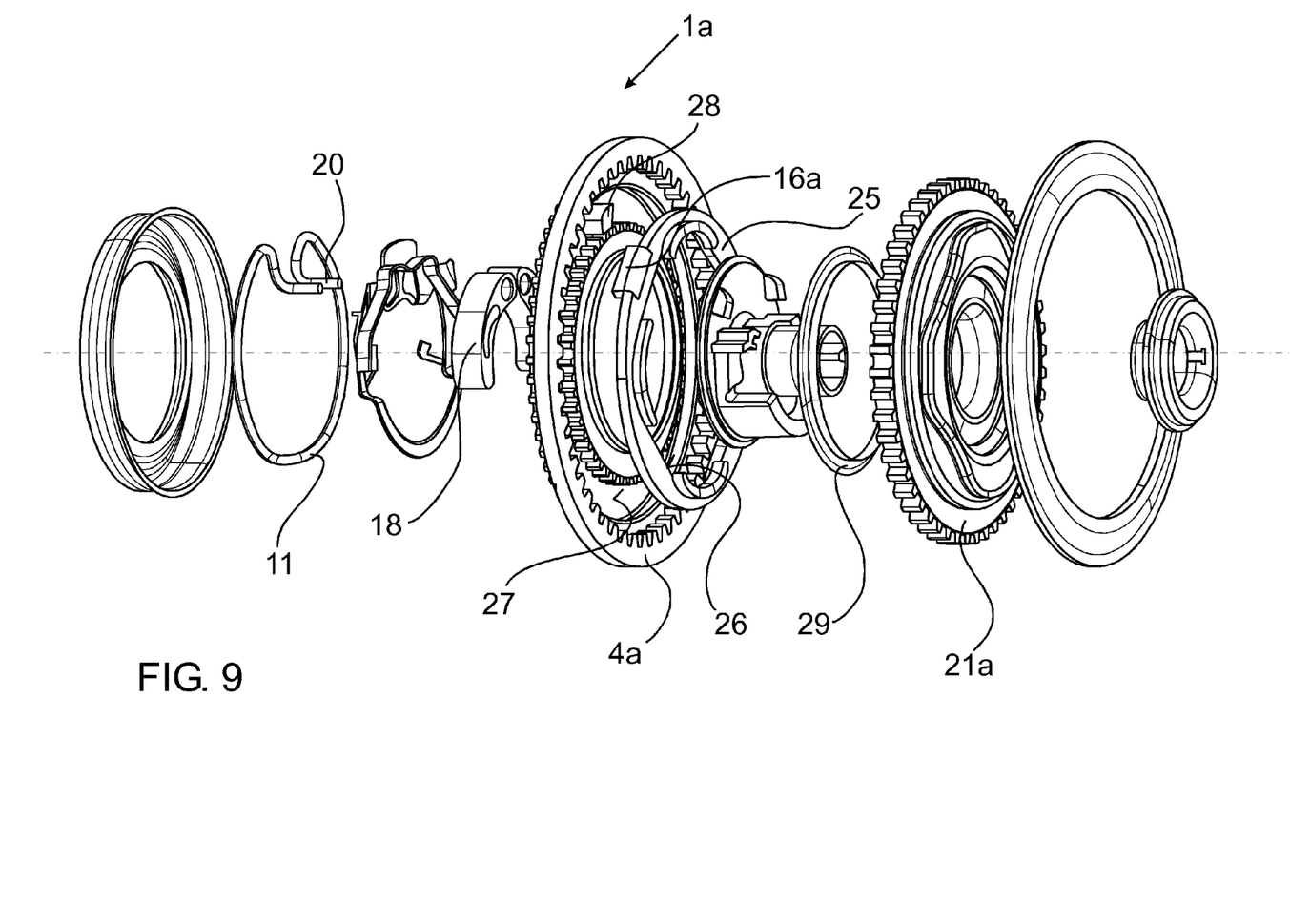
FIG. 9 is an exploded representation of a second embodiment of a seat fitting.

FIG. 9 shows a second embodiment of a vehicle seat fitting 1a in an exploded representation. In contrast to the seat fitting 1 shown in the FIGS. 1 to 8, the seat fitting 1a—which otherwise largely corresponds to the seat fitting 1—has a separate stop cam carrier formed as a stop ring 25, that is provided with a stop cam 16a.

Figure 10:
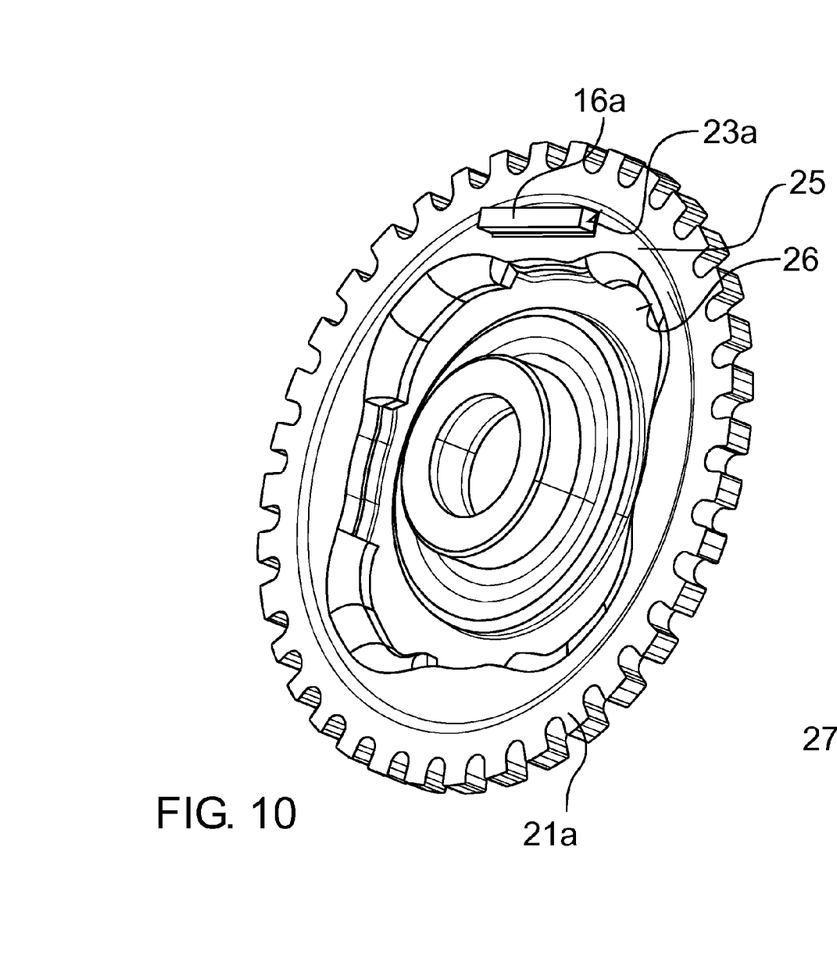
FIG. 10 is a perspective representation of the gear wheel of the seat fitting from FIG. 9 with a stop ring, having a stop cam, arranged thereupon.

In the assembled state of the seat fitting 1a, the stop ring 25 is connected, secured against rotation, to the gear wheel 4a such that the stop cam 16a is also fixed relative to the gear wheel 4a. For this purpose, a gear wheel 4a has a deepening 27 having a "flower-like" contouring 26, and the stop ring 25 has a correspondingly formed shape, whereby a form locking arises in the peripheral direction.

Figure 11:
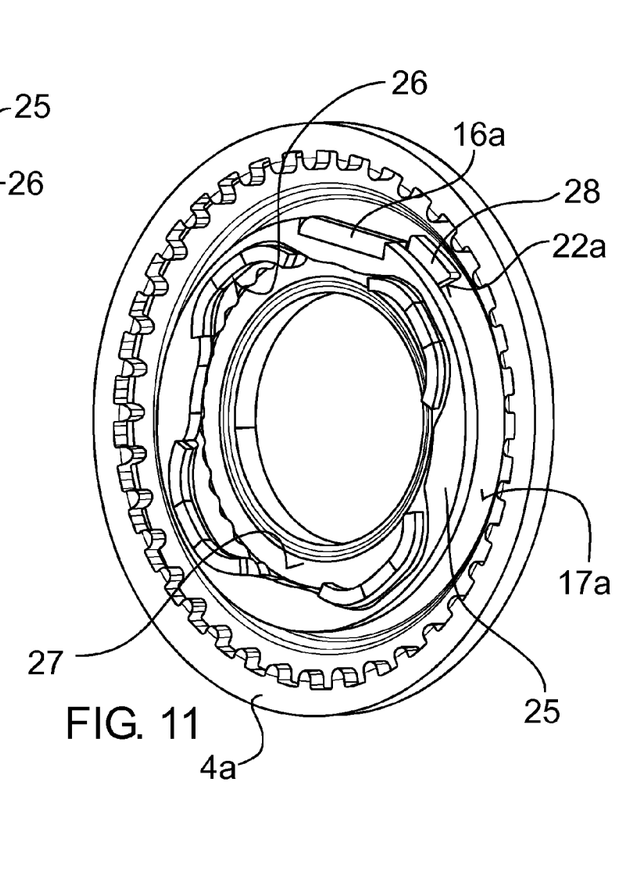
FIG. 11 is a perspective representation of the ring gear of the seat fitting from FIG. 9 with the stop ring arranged thereupon.

The stop cam 16a projects from the stop ring 25 in the axial direction towards the ring gear 21a, wherein the stop cam 16a in the assembled state is arranged rotatably within the cam receptacle 17a of the ring gear 21a. The cam receptacle 17a formed circumferentially on the ring gear 21 is interrupted by a punched-through locking element 28, the side surfaces of which form a stop for the stop cam 16a, whereby the adjustment movement of the ring gear 21a is limited relative to the gear wheel 4a.

A separating ring 29 that can be clipped on, serves for securing the stop ring 25 in position relative to the gear wheel 4a, and using this separating ring, the stop ring 25 is secured against axial and radial movement.

While specific embodiments of the invention have been shown and described in detail to illustrate the application of the principles of the invention, it will be understood that the invention may be embodied otherwise without departing from such principles.

The invention claimed is:

1. A seat fitting for a motor vehicle seat, the seat fitting comprising:
   a fitting top part with a ring gear that has internal toothing;
   a fitting bottom part with a gear wheel, which has external toothing and which is in engagement with the ring gear;
   an eccentric arranged rotatably in a bore of the fitting bottom part running axially to the gear wheel for rolling adjustment of the gear wheel relative to the ring gear; and
   a drive shaft, which drives the eccentric and extends axially to the ring gear, wherein:
   a cam receptacle is arranged on one of the gear wheel or the ring gear;
   a stop cam, engaging into the cam receptacle, is arranged on the other of the gear wheel or the ring gear; and
   the stop cam or the cam receptacle is arranged on the gear wheel in a ring portion running between the external toothing and the bore and is arranged on the ring gear in a zone which can be overlapped by the ring portion, the stop cam being arranged on a stop cam carrier that can be connected, secured against rotation, to the ring gear or the gear wheel.

2. The seat fitting according to claim 1, wherein the cam receptacle and/or the stop cam have a progression coaxial to the associated bore.

3. The seat fitting according to claim 1, wherein side surfaces of the stop cam oriented in the peripheral direction, have a shape matched to side surfaces of the cam receptacle.

4. The seat fitting according to claim 1, wherein the stop cam carrier, and the ring gear or the gear wheel have a corresponding design, such that the stop cam carrier in the assembled state is secured against rotation relative to the gear wheel or the ring gear.

5. The seat fitting according to claim 1, wherein the cam receptacle is formed by an annular cavity, circumferential in the assembled state, that is interrupted by a locking element.

6. The seat fitting according to claim 1, wherein the stop cam and the cam receptacle are formed such that during an adjustment, the stop cam moved relative to the cam receptacle on a cycloid-shaped path comes into contact with the side surface of the cam receptacle in the zone of the path, in which the portion of the movement path oriented in the peripheral direction is greater than the portion of the movement oriented in the radial direction.

7. The seat fitting according to claim 1, further comprising at least another cam receptacle to provide a plurality of cam receptacles of different length arranged in a peripheral direction on the ring gear or gear wheel.

8. The seat fitting according to claim 1, wherein the fitting top part is formed integrally with the ring gear and/or the fitting bottom part is formed integrally with the gear wheel.

9. The seat fitting according to claim 1, wherein the eccentric has a catch and two wedge segments.

10. The seat fitting according to claim 1, further comprising a spring element wherein the wedge segments are pressed apart from each other in the peripheral direction by the spring element.

11. A motor vehicle seat fitting comprising:
    a fitting first part with a ring gear comprising internal toothing;
    a fitting second part with a gear wheel comprising external toothing, the external toothing being engaged with the internal toothing;
    an eccentric arranged rotatably in a bore of the fitting second part, the bore extending axially to the gear wheel for a rolling adjustment of the gear wheel relative to the ring gear;
    a drive shaft, which drives the eccentric and extends axially to the ring gear;
    a cam receptacle associated with one of the gear wheel and the ring gear; and
    a stop cam associated with another of the gear wheel and the ring gear, the stop cam extending into the cam receptacle, one of the stop cam and the cam receptacle being positioned in a region of a ring portion between the external toothing and the bore another of the stop cam and the cam receptacle being positioned in a region adjacent to the ring portion, the stop cam being formed as a part of a stop cam carrier secured against rotation to said another of the gear wheel and the ring gear.

12. The seat fitting according to claim 11, wherein at least one of the cam receptacle and the stop cam have a course that extends coaxially to the bore.

13. The seat fitting according to claim 11, wherein side surfaces of the stop cam, oriented in a peripheral direction, have a shape matched to side surfaces of the cam receptacle.

14. The seat fitting according to claim 11, wherein the stop cam carrier is secured against rotation relative to the gear wheel or the ring gear.

15. The seat fitting according to claim 11, wherein the cam receptacle is formed by an annular cavity that extends circumferentially and is interrupted by a locking element.

16. The seat fitting according to claim 11, wherein the stop cam and the cam receptacle have a shape such that during rolling adjustment of the gear wheel relative to the ring gear, the stop cam moves relative to the cam receptacle on a cycloid-shaped path and comes into contact with a side surface of the cam receptacle over a portion of the path, in which the portion of the movement path oriented in the peripheral direction is greater than the portion of the movement oriented in the radial direction.

17. The seat fitting according to claim 11, further comprising at least another cam receptacle to provide a plurality of cam receptacles of different length arranged in a peripheral direction on the ring gear or gear wheel.

18. The seat fitting according to claim 11, wherein at least one of the fitting first part is formed as an integral part including the ring gear and the fitting second part is formed as an integral part including the gear wheel.

\* \* \* \* \*